United States Patent
Takiguchi et al.

(10) Patent No.: US 9,704,395 B2
(45) Date of Patent: Jul. 11, 2017

(54) TRAFFIC SIGN DETERMINATION DEVICE

(71) Applicant: HONDA MOTOR CO., LTD., Minato-Ku, Tokyo (JP)

(72) Inventors: Hirotaka Takiguchi, Wako (JP); Yuji Yokochi, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 15/070,221

(22) Filed: Mar. 15, 2016

(65) Prior Publication Data

US 2016/0275792 A1  Sep. 22, 2016

(30) Foreign Application Priority Data

Mar. 17, 2015 (JP) ................ 2015-053882

(51) Int. Cl.
| | |
|---|---|
| G08G 1/00 | (2006.01) |
| G01C 21/30 | (2006.01) |
| G08G 1/0962 | (2006.01) |
| G06K 9/00 | (2006.01) |

(52) U.S. Cl.
CPC ......... *G08G 1/09623* (2013.01); *G01C 21/30* (2013.01); *G06K 9/00818* (2013.01); *G08G 1/09626* (2013.01)

(58) Field of Classification Search
CPC combination set(s) only.
See application file for complete search history.

(56) References Cited

U.S. PATENT DOCUMENTS

| | | | |
|---|---|---|---|
| 6,363,161 B2* | 3/2002 | Laumeyer | G06K 9/00818 382/104 |
| 7,058,206 B1* | 6/2006 | Janssen | B60K 35/00 340/907 |
| 8,725,394 B2* | 5/2014 | Bahlmann | B60W 30/146 340/907 |
| 2003/0105578 A1* | 6/2003 | Takenaga | B60W 30/16 701/117 |

(Continued)

FOREIGN PATENT DOCUMENTS

| | | |
|---|---|---|
| JP | 2012164254 A | 8/2012 |
| JP | 2012185076 A | 9/2012 |

OTHER PUBLICATIONS

Office Action issued on Aug. 30, 2016 for corresponding Japanese Patent Application No. 2015-053882 with English translation.

*Primary Examiner* — Yonel Beaulieu
(74) *Attorney, Agent, or Firm* — Carrier Blackman & Associates, P.C.; Joseph P. Carrier; Jeffrey T. Gedeon

(57) ABSTRACT

A traffic sign determination device includes: an image recognition section which detects a first traffic regulation sign by performing an image recognition process on an image of an area in front of a vehicle picked up by an imaging section provided on the vehicle; a map information acquisition section which, using a position of the vehicle, acquires a road link, including a second road at the position of the vehicle, from a storage section; and a traffic sign determination section which, upon detection of a current first traffic regulation sign on a current road link, determines, until the vehicle passes an end point of the current road link, that a current traffic regulation sign to be notified to an occupant of the vehicle is the current first traffic regulation sign detected on the current road link.

6 Claims, 8 Drawing Sheets

(56) References Cited

U.S. PATENT DOCUMENTS

| | | | |
|---|---|---|---|
| 2006/0095195 A1* | 5/2006 | Nishimura | B60W 30/025 701/96 |
| 2006/0142933 A1* | 6/2006 | Feng | G07B 15/063 701/117 |
| 2009/0024321 A1* | 1/2009 | Bando | G01C 21/36 701/414 |
| 2010/0188288 A1* | 7/2010 | Bahlmann | B60W 30/146 342/357.23 |
| 2012/0046855 A1* | 2/2012 | Wey | G08G 1/09623 701/117 |
| 2015/0367779 A1* | 12/2015 | Ohdachi | G08G 1/0967 340/905 |

* cited by examiner

TRAFFIC SIGN DETERMINATION DEVICE

FIELD OF THE INVENTION

The present invention relates to devices for determining a road or traffic sign (final traffic sign) to be notified to an occupant of a vehicle by use of both a traffic sign based on a picked-up image and a traffic sign based on map data.

BACKGROUND OF THE INVENTION

Japanese Patent Application Laid-open Publication No. 2012-185076 discloses a speed limit value notification device which is capable of using both a traffic sign detected from an image picked up by a vehicle-mounted cameral and a traffic sign acquired from map data stored in a map data storage section.

However, the speed limit value notification device disclosed in the No. 2012-185076 publication cannot notify an occupant of a vehicle of a final traffic sign when the traffic sign based on the picked-up image and the traffic sign based on the map data do not agree with, or match, each other. In other words, the speed limit value notification device disclosed in the No. 2012-185076 publication merely presupposes that the traffic signs based on the map data have a high reliability. Thus, the inventors of the present invention etc. realized that, when the traffic signs based on the map data have a low reliability, the speed limit value notification device disclosed in the No. 2012-185076 publication can notify the vehicle occupant of final traffic signs only from a short time period.

SUMMARY OF THE INVENTION

In view of the foregoing prior art problems, it is an object of the present invention to provide an improved traffic sign determination device capable of determining a final traffic sign for a longer time period. Other objects of the present invention will become apparent to a person skilled in the art with reference to the following illustrative description of preferred embodiments and the accompanying drawings.

According to a first aspect of the present invention, there is provided an improved traffic sign determination device, which comprises: an image recognition section which detects a first traffic regulation sign by performing an image recognition process on an image of an area in front of a vehicle picked up by an imaging section provided on the vehicle; a map information acquisition section which, using a position of the vehicle, acquires a road link, including a second traffic regulation sign at the position of the vehicle, from a map data storage section storing map data that includes road link information related to roads constituting a map; and a traffic sign determination section which, upon detection of a current first traffic regulation sign on a current road link, determines, until the position of the vehicle passes an end point of the current road link, that a current traffic regulation sign to be notified to an occupant of the vehicle is the current first traffic regulation sign detected on the current road link.

According to the first aspect, the traffic sign determination section can select, as the current traffic regulation sign to be notified to the occupant of the vehicle (vehicle occupant), the first traffic regulation sign (i.e., traffic regulation sign detected by the image recognition section) rather than the second traffic regulation sign (i.e., traffic regulation sign acquired by the map information acquisition section. Further, the state in which the first traffic regulation sign detected by the imaging section is selected is, in principle, maintained until the position of the vehicle passes the end point of the current road link (i.e., end-point node of the current road link), instead of being limited to a predetermined short time period following the detection of the first traffic regulation sign. In this way, the traffic sign determination device can determine the traffic regulation signs to be notified to the vehicle occupant, for a longer time period.

According to a second aspect of the invention depending on the first aspect, the traffic sign determination section determines whether or not the current first traffic regulation sign detected on the current road link agrees with, or matches, a current second traffic regulation sign acquired on the current road link. When the current first traffic regulation sign does not agree with the current second traffic regulation sign, the traffic sign determination section selects the current first traffic regulation sign as the current traffic regulation sign to be notified to the occupant of the vehicle.

According to the second aspect, when the first traffic regulation sign detected by the detected by the image recognition section does not agree with the second traffic regulation sign acquired by the map information acquisition section, or in other words, when the traffic sign determination section recognizes the map data to be old or out of date and hence no longer valid, the state in which the first traffic regulation sign detected by the imaging section is selected is maintained.

Although it is preferable that the map data be always the latest or up to date, always keeping the map data up to date is difficult. When the map data is out of date, the second traffic regulation sign based on the map date would have a poor or low reliability. However, the inventors of the present invention etc. realized that, even in a situation where the second traffic regulation sign based on the map date itself tends to easily get old or out of date, information related to the second traffic regulation sign (e.g., end point of the road link) does not easily get out of date or is difficult to be changed. In other words, even in a situation where the second traffic regulation sign based on the map date itself has a low reliability, the end point of the road link related to the second traffic regulation sign is not low in reliability. Note that, because first traffic regulation signs actually detected by the image recognition section are always the latest, the first traffic regulation signs themselves have a high reliability.

Further, according to the second aspect, the first traffic regulation sign actually detected by the image recognition section and having a high reliability is selected as the traffic regulation signs to be notified to the vehicle occupant till the end point of the road link, related to the second traffic regulation sign, which has a not-low reliability. In this way, the traffic sign determination device of the invention can determine the traffic regulation sign to be notified to the vehicle occupant, for a longer time period.

Further, according to a third aspect of the invention depending on the first or second aspect, when the current second traffic regulation sign changes on the current road link after the detection of the current first traffic regulation sign on the current road link, the traffic sign determination section stops the determination of the current traffic regulation sign to be notified to the occupant of the vehicle and cancels the selection of the first traffic regulation sign as the as the traffic regulation signs to be notified to the vehicle occupant.

According to the third aspect, when the current second traffic regulation sign changes on the current road link, the state in which the first traffic regulation sign detected by the imaging section is selected is, as an exception, not maintained till the end point of the current road link. Namely, at an intermediate or en route point of the current road link, the first traffic regulation sign detected by the imaging section is stopped from being selected as the traffic regulation sign to be notified to the occupant of the vehicle, in accordance with information related to the second traffic regulation sign (i.e., change of the second traffic regulation sign) which has a not-low reliability. In this way, the traffic sign determination device of the present invention can prevent an erroneous traffic regulation sign from being selected as the traffic regulation sign to be notified to the occupant of the vehicle.

According to a third aspect of the invention depending on any one of the first to third aspects, when a current second traffic regulation sign is acquired on the current road link before the detection of the current first traffic regulation sign on the current road link, the traffic sign determination section does not select the current second traffic regulation sign as the current traffic regulation sign to be notified to the occupant of the vehicle.

According to the fourth aspect, in consideration of a possibility that there is an error in the acquisition of the current second traffic regulation sign, the traffic sign determination device of the present invention can invalidate the current second traffic regulation sign. Namely, because it is unlikely that there is an error in the detection of the traffic sign based on the picked-up image, the traffic sign determination device of the present invention can give the current first traffic regulation sign a priority over the second traffic regulation sign.

Further, according to a fifth aspect of the present invention, there is provided an improved traffic sign determination method, which comprises: detecting a first traffic regulation sign by performing an image recognition process on an image of an area in front of a vehicle picked up by an imaging section provided on the vehicle; using a position of the vehicle to acquire a road link, including a second traffic regulation sign at the position of the vehicle, from a map data storage section storing map data that includes road link information related to roads constituting a map; upon detection of a current first traffic regulation sign on a current road link, determining whether or not the current first traffic regulation sign detected on the current road link agrees with a current second traffic regulation sign acquired on the current road link; and when the current first traffic regulation sign does not agree with the current second traffic regulation sign, selecting the current first traffic regulation sign as the current traffic regulation sign to be notified to an occupant of the vehicle.

According to the fifth aspect, when the current first traffic regulation sign based on the picked-up image does not agree with the current second traffic regulation sign based on the map data, or in other words, when the map data is old or out of date, the state in which the first traffic regulation sign detected by the imaging section is selected is, in principle, maintained until the position of the vehicle passes the end point of the current road link. In this way, the traffic sign determination device of the present invention can determine the traffic regulation sign to be notified to the occupant of the vehicle, for a longer time period.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE INVENTION

The following will describe preferred embodiments of the present invention in order to facilitate understanding of the basic principles of the invention, but it should be appreciated that the present invention is not limited to the described embodiments.

Figure 1:
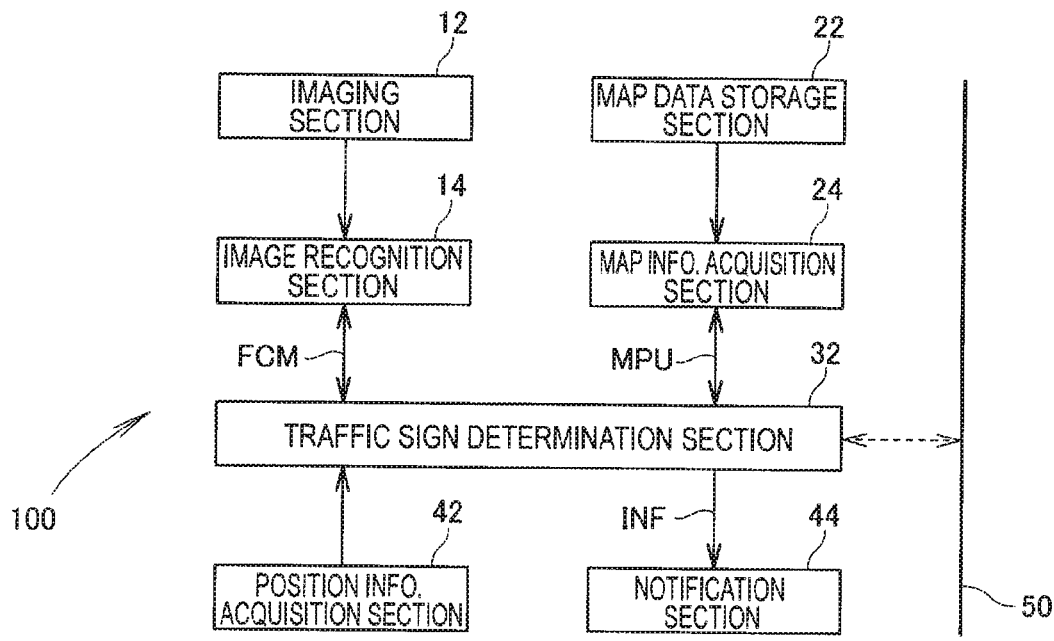
FIG. 1 is a block diagram showing an example overall construction of a traffic sign determination device according to an embodiment of the present invention.

FIG. 1 is a block diagram showing an example overall construction of a traffic sign determination device 100 according to an embodiment of the present invention. As shown, the traffic sign determination device 100 includes an image recognition section 14, a map information acquisition section 24 and a traffic sign determination section 32. The traffic sign determination device 100 further includes an imaging section 12, a map data storage section 22, a position information acquisition section 42 and a notification section 44. Needless to say, the traffic sign determination device 100 need not necessarily include all of the aforementioned components and may include one or more other components not shown here. In addition, the traffic sign determination device 100 of FIG. 1 is capable of inputting information or data from a vehicle-mounted network 50 and outputting information or data to the vehicle-mounted network 50.

The imaging section 12 shown in FIG. 1 is provided on or in a vehicle, e.g. in a passenger compartment, and can pick up an image of an area in front of the vehicle (as viewed in a traveling direction of the vehicle). Of course, the imaging section 12 may be provided in front of a mirror (rear view mirror) within the passenger compartment. As an alternative, the imaging section 12 may be one usable for a plurality of functions, such as a drive recorder function. Alternatively, the imaging section 12 may be disposed outside the vehicle, such as on the back of a car emblem, a front bumper or the like. Namely, the imaging section 12 may be disposed at any desired position of the vehicle as long as it can image an area in front of the vehicle (as viewed in the traveling direction of the vehicle). Preferably, the imaging section 12 includes imaging sensors (imaging elements), such as CCDs or COMS transistors, to pick up and generate an image in digital form. The imaging section 12 further includes an imaging lens for forming an image of a subject (a traffic sign or the like located in front of the vehicle) on image planes of the imaging sensors, and it is preferable that the imaging lens be automatically driven by an auto focus motor to be properly adjusted in position. In addition, the imaging section 12 may either continue outputting real-time picked-up images to the image recognition section 14 or output picked-up images to the image recognition section 14 at predetermined periodic or non-periodic timing.

The image recognition section 14 of FIG. 1 inputs a picked-up image in digital form from the imaging section 12 and performs an image recognition process on the input picked-up image. The image recognition section 14 can detect a traffic sign by determining whether a predetermined pattern of characters, figures and/or the like is present in the input picked-up image. In the illustrated example of FIG. 1, the image recognition section 14 detects a traffic regulation sign, from among various traffic signs, that prohibits vehicles from a particular driving activity or instructs vehicles to travel in accordance with a particular manner. For example, the traffic regulation sign includes regulatory speed (speed limit) information for prohibiting vehicles to travel at speeds higher than a predetermined speed (maximum speed) indicated by the regulatory speed information. In this way, the image recognition section 14 can detect from the input picked-up image a traffic regulation sign indicative for example of a regulatory speed, and output the thus-detected traffic regulation sign (such a detected traffic sign will hereinafter be referred to also as "first traffic regulation sign").

In the case where the imaging section 12 of FIG. 1 comprises a camera, the imaging section 12 and the mage recognition section 14 can be referred to collectively as "Front Camera Module" or "FCM". Reference character "FCM" in FIG. 1 represents a traffic regulation sign (first traffic regulation sign) output from the mage recognition section 14.

The map data storage section 22 of FIG. 1 has map data, including road link information, stored therein. The map data storage section 22 comprises, for example, a drive device, such as an SSD, HDD or DVD or a combination thereof, that is accessed by the map information acquisition section 24.

Figure 2:
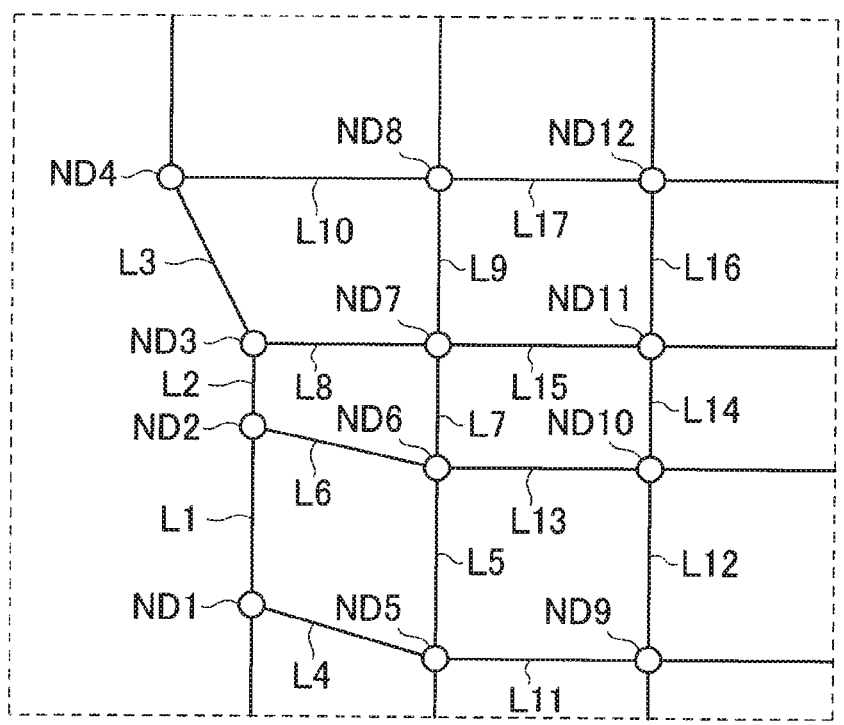
FIG. 2 is a diagram explanatory of road link information employed in the traffic sign determination device.

FIG. 2 is a diagram explanatory of the road link information that is information about roads constituting a map. In FIG. 2, a plurality of road links L1 to L17 are shown. Each of the road links (e.g., road link L1) is indicative of a road section between one node (e.g., node ND1) and another node (e.g., node ND2) immediately following the one node and includes a traffic regulation sign, such as a regulatory speed, of the road link; such a traffic regulation sign included in the road link information will hereinafter be referred to also as "second traffic regulation sign"). In addition, each of the road links L1 to L17 is assigned a respective link No. and may include a position (coordinates) of the traffic regulation sign (second traffic regulation sign), a distance from a start point, etc. Note that each of the nodes is assigned a respective node No. and includes a position (coordinates) of the node. Each of the nodes is, for example, a point of intersection although it may be other than a point of intersection.

The map information acquisition section 24 of FIG. 1 uses a current position of the vehicle to acquire from the map data storage section 22 a road link at the current position of the vehicle. For example, when the vehicle is traveling on the road link L1, the map information acquisition section 24 can acquire a regulatory speed (second traffic regulation sign) of the road link L1. In the illustrated example of FIG. 1, the position of the vehicle is acquired by the position information acquisition section 42, and input to the map information acquisition section 24, so that the map information acquisition section 24 can determine whether the vehicle has reached the end point of the road link. Alternatively, once the position of the vehicle acquired by the position information acquisition section 42 is input to the map information acquisition section 24, the map information acquisition section 24 may output a position (coordinates) of the end point node of the road link at the current position of the vehicle, to the traffic sign determination section 32 so that the traffic sign determination section 32 can determine whether the vehicle has reached an end point of the road link. In this way, the map information acquisition section 24 or the traffic sign determination section 32 can determine whether the current position of the vehicle has passed the end point (end point node) of the road link.

Note that the map data storage section 22 and the map information acquisition section 24 may be referred to collectively as "Map Positioning Unit" or "MPU". Further, reference character "MPU" of FIG. 1 represents a traffic regulation sign (second traffic regulation sign) output from the MPU or the map information acquisition section 24. Further, the MPU may include the position information acquisition section 42 that comprises, for example, a GPS receiver. Of course, the position information acquisition section 42 may include, in place of or in addition to the GPS receiver, a position sensor, such as a gyro sensor and/or an acceleration sensor.

The regulatory speed (first traffic regulation sign) detected by the FCM and the regulatory speed (second traffic regulation sign) acquired by the MPU are input to the traffic sign determination section 32 of FIG. 1, so that the traffic sign determination section 32 can determine whether the two input regulatory speeds agree with, or match, each other. If the two input regulatory speeds do not agree with each other, the traffic sign determination section 32 can determine that the map data is old or out of date and hence currently invalid. However, the traffic sign determination section 32 need not necessarily determine whether or not the map data is old or out of date, or in other words, whether or not there is an error in the acquisition, by the MPU, of the regulatory speed (second traffic regulation sign). Namely, the inventors of the present invention etc. realized that, even in a situation where the second traffic regulation sign based on the map date itself tends to get old or out of date, information related to the second traffic regulation sign (e.g., end point of the road link) does not easily get out of date or is difficult to be changed, and, based on the realization, the inventors of the present invention etc. decided to cause the traffic sign determination section 32 to use, for example, the end point of the road link.

More specifically, when a traffic regulation sign such as a regulatory speed (current first rod regulation sign) is detected on the current road link, the traffic sign determination section 32 can determine that a current traffic sign to be notified to an occupant of the vehicle (current final traffic sign) is the current first rod regulation sign, until the vehicle passes the end point of the current road link. Because the regulatory speed (first traffic regulation sign) detected by the FCM is always the latest or up to the date whereas the map data tends to easily get old (out of date), the first traffic regulation sign itself has a high reliability. Further, even in a situation where the second traffic regulation sign based on the map data gets old (out of date), reliability of the end point of the road link based on the map data is not low, and thus, the traffic sign determination section 32 can select the first traffic regulation sign as the current final traffic sign, until the vehicle reaches the end point of the road link, i.e. for a longer time period.

Reference character "INF" in FIG. 1 represents a current final regulatory traffic sign (i.e., traffic sign to be notified to the vehicle occupant) output from the traffic sign determination section 32. The notification section 44, which comprises for example a display, can visually display, as the current final regulatory traffic sign, a first traffic regulation sign (e.g., regulatory speed) detected by the FCM. Thus, the vehicle occupant can recognize the current final traffic regulation sign. Needless to say, the notification section 44 may alternatively comprise a speaker and may notify the vehicle occupant of the current final traffic regulation sign by audible sound or voice.

The traffic sign determination device 100 of FIG. 1 may be referred to also as "traffic sign recognition device" or "TSR device". Further, the traffic sign determination device 100 of FIG. 1 may constitute, for example, a navigation device or a navigation system. In other words, a processing section of the navigation device connected to the FCM may have, for example, functions of the map information acquisition section 24 and the traffic sign determination section 32. As another alternative, the processing section of the navigation device may have, for example, functions of the image recognition section 14, the map information acquisition section 24 and the traffic sign determination section 32. In addition, the traffic sign determination device 100 may constitute a drive recorder; in other words, the imaging section 12 may be a camera of the drive recorder.

Figure 3A:
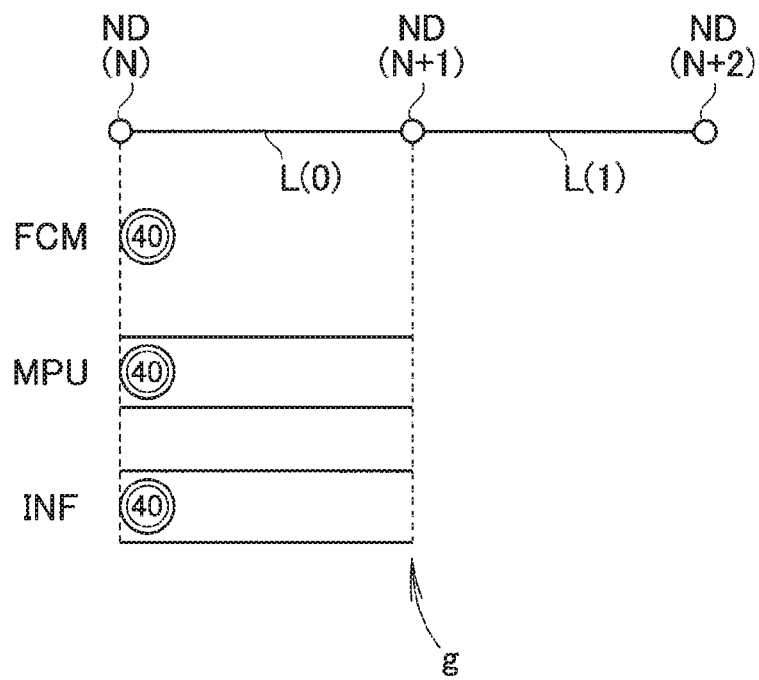
FIG. 3A is a diagram explanatory of a first example of operation of the traffic sign determination device of FIG. 1.
Figure 3B:
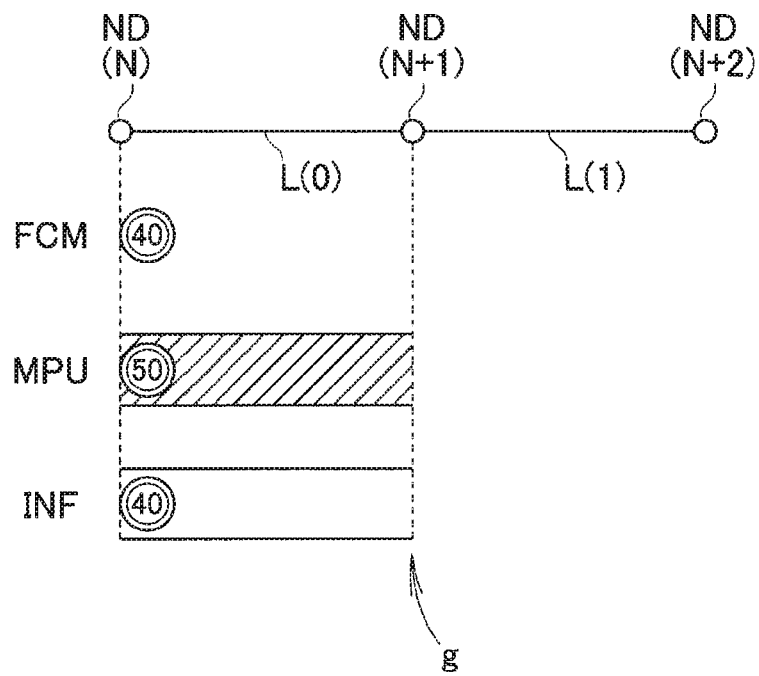
FIG. 3B is a diagram explanatory of a second example of operation of the traffic sign determination device of FIG. 1.

FIG. 3A is explanatory of a first example of behavior or operation of the traffic sign determination device 100 of FIG. 1, and FIG. 3B is explanatory of a second example of operation of the traffic sign determination device 100 of FIG. 1. As shown in FIG. 3A, when the vehicle enters a road link L(0), the image recognition section 14 (hereinafter also referred to as "FCM") detects a regulatory speed of, for example, "40 km/h", and the map information acquisition section 24 (hereinafter also referred to as "MPU") acquires the regulatory speed of, for example, "40 km/h". Because the regulatory speed detected by the FCM (first traffic regulation sign) agrees with the regulatory speed acquired by the MPU (second traffic regulation sign), there is no error in the acquisition of the second traffic regulation sign based on the map data. However, in consideration of a possibility that there is an error in the acquisition of the second traffic regulation sign based on the map data, the traffic sign determination section 32 can give the current first traffic regulation sign a priority over the second traffic regulation sign. Thus, a final traffic regulation sign (INF) output from the traffic sign determination section 32 is set at a regulatory speed detected by the FCM, e.g. 40 km/h.

If the map data is old or out of date and hence or no longer valid, the MPU may acquire from the map data a regulatory speed of, for example 50 km/h (see FIG. 3B). Because the regulatory speed (first traffic regulation sign) detected by the FCM and the regulatory speed (second traffic regulation sign) acquired by the MPU do not agree with each other, an error exists in the acquisition of the second traffic regulation sign based on the map data. Even in such a situation, the traffic sign determination section 32 can give the current first traffic regulation sign a priority over the second traffic regulation sign. Thus, the final traffic regulation sign (INF) output from the traffic sign determination section 32 is set at the regulatory speed detected by the FCM, e.g. 40 km/h (see FIG. 3B).

In the case where the first traffic regulation sign is given a priority over the second traffic regulation sign, it is conceivable to employ a scheme where the final traffic regulation sign (INF) is set at the regulatory speed detected by the FCM, e.g. 40 km/h, only for a predetermined time period (e.g., 5 sec) following the detection of the first traffic regulation sign. With this scheme, however, the time period for which the final traffic regulation sign (INF) can be notified to the vehicle occupant would be undesirably short.

In FIGS. 3A and 3B, the state where the first traffic regulation sign (indicative of the regulatory speed of, for example, 40 km/h) detected by the FCM is selected is maintained until the position of the vehicle passes the end point (e.g., end point node ND (N+1)) of the current road link L(0) (see arrow g). More specifically, when the MPU acquires the current road link L(0), the map information acquisition section 24 or the traffic sign determination section 32 determines up to which point of the current road link L(0) the regulatory speed detected by the MPU (second traffic regulation sign) is valid. In FIG. 3(A) or 3B, the regulatory speed of, for example, 40 km/h or 50 km/h is valid up to or till the end point of the current road link L(0). Thus, the notification section 44 can continue providing a display corresponding to the regulatory speed of, for example, 40 km/h detected by the FCM (see arrow g in FIGS. 3A and 3B). Namely, the traffic sign determination device 100 of FIG. 1 can determine or decide the traffic regulation sign (INF) to be notified to the vehicle occupant for a longer time period.

Figure 4A:
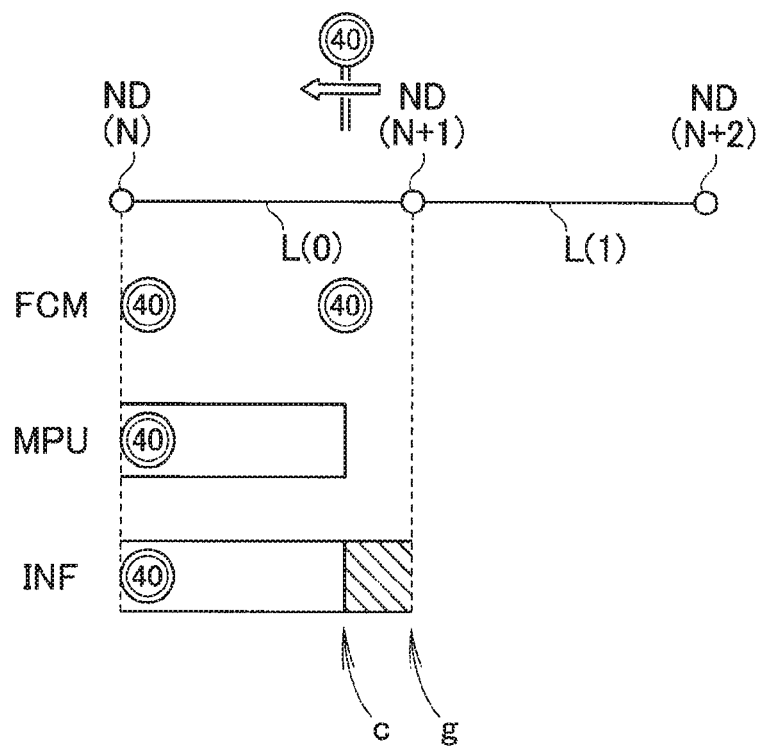
FIG. 4A is a diagram explanatory of a third example of operation of the traffic sign determination device of FIG. 1.
Figure 4B:
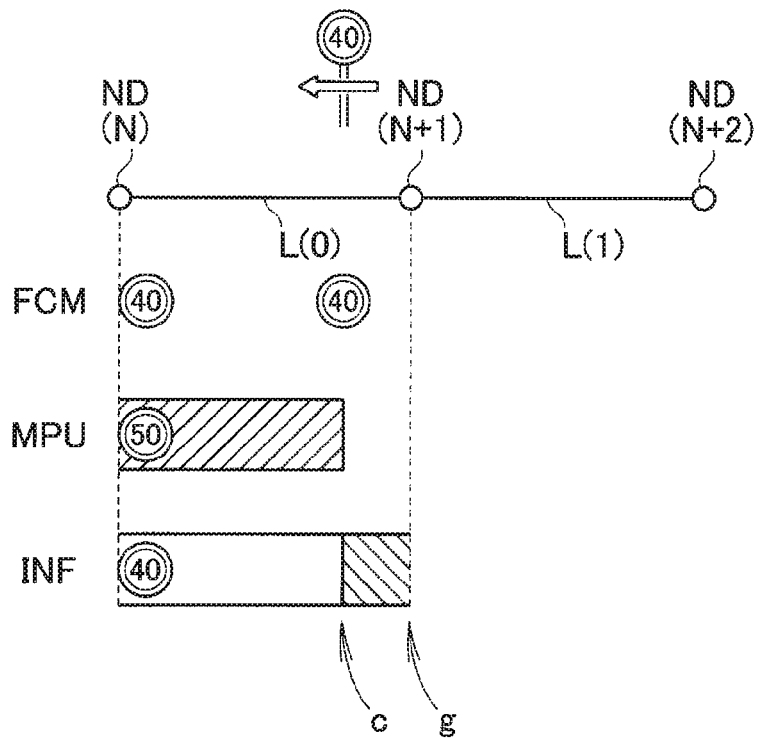
FIG. 4B is a diagram explanatory of a fourth example of operation of the traffic sign determination device of FIG. 1.

FIG. 4A is explanatory of a third example of operation of the traffic sign determination device 100 of FIG. 1, and FIG. 4B is explanatory of a fourth example of operation of the traffic sign determination device 100 of FIG. 1. FIGS. 4A and 4B show, as an example of an actual en-route traffic regulation sign present on the way through on the current road link L(0), a combination of a regulatory speed sign (main sign) indicative for example of 40 km/h and an arrow (auxiliary sign) indicative for example of "Up To Here". This combination is indicative of an end or change of the regulatory speed.

In FIG. 4A, when the vehicle enters the road link L(0), the FCM detects the regulatory speed of 40 km/h, and the MPU acquires the regulatory speed of 40 km/h. Then, during travel on the current road link L(0), i.e. at an en route point of the current road link L(0), the FCM detects the regulatory speed of 40 km/h, and the MPU acquires an end of the regulatory speed of 40 km/h.

In the illustrated example of FIG. 4A, the FCM detects only the regulatory speed of 40 km/h (i.e., main sign) and does not detect the arrow (auxiliary sign) indicating "UP TO HERE" during the travel of the vehicle on the current road link L(0). In other words, during the travel of the vehicle on the current road link L(0), or at an en route point of the current road link L(0), the FCM does not detect the end of the regulatory speed of 40 km/h. The reason why the FCM cannot detect the arrow (auxiliary sign) is that the picked-up image has a low resolution, the arrow (auxiliary sign) is not preset as a predetermined pattern in the FCM, and/or the like. Needless to say, the FCM may detect the auxiliary sign as well as the main sign.

In the illustrated example of FIG. 4A, the MPU, on the other hand, detects the end of the regulatory speed of 40 km/h at an en route point of the current road link L(0). The reason why the MPU can detect the end of the regulatory speed of 40 km/h is that the map data includes the position (coordinates) of the end of the regulatory speed, and/or the like. Note that, although the MPU acquires the end of the regulatory speed at an en route point of the current road link L(0) in the illustrated example of FIG. 4A, the MPU may acquire, for example, a regulatory speed (i.e., a maximum speed after the end or change of the regulatory speed of the current road link L(0)) of the next road link L(1) at an en route point of the current road link L(0).

Once the regulatory speed acquired by the MPU (second traffic regulation sign) changes at an intermediate or en route point of the road link L(0), the traffic sign determination section 32 stops its determination of the current final traffic regulation sign (INF). Thus, the traffic sign determination section 32 does not select, as the current final traffic sign (INF), the regulatory speed of 40 km/h (only the main sign) detected by the FCM at the en route point of the road link L(0). In addition, the traffic sign determination section 32 can cancel the selection of the regulatory speed of 40 km/h detected by the FCM at the entrance of the road link L(0) (see arrow c). In other words, in the illustrated example of FIG. 4A, the current final traffic sign (INF) is stopped at the en route point of the road link L(0) from being set at the regulatory speed detected by the FCM, and the state where the regulatory speed of 40 km/h is selected is not continued up to the end point of the current road link L(0) (see arrow g). Thus, the traffic sign determination section 32 can avoid selection of an erroneous regulatory speed (maximum speed before the end or change of the regulatory speed) from the intermediate point to the end point of the road link L(0).

In FIG. 4B, when the vehicle enters the road link L(0), the FCM detects a regulatory speed of 40 km/h, and the MPU acquires a regulatory speed of 50 km/h. Then, during travel of the vehicle on the current road link L(0), the FCM detects a regulatory speed of 40 km/h at an en route point of the current road link L(0), and the MPU acquires an end of the regulatory speed of 50 km/h at an en route point of the current road link L(0).

In the illustrated example of FIG. 4B, because the regulatory speed (first traffic regulation sign) detected by the FCM at the entrance of the road link L(0) does not agree with the regulatory speed (second traffic regulation sign) acquired by the MPU, the map data is out of date. Even in a situation where the second traffic regulation sign based on the map data itself gets old (out of date) like this, information related to the second traffic regulation sign (change in the second traffic regulation sign at an en route point of the road link) would not easily get out of date. Thus, in the illustrated example of FIG. 4B, the current final traffic sign (INF) is stopped at the en route point of the road link L(0) from being set at the regulatory speed detected by the FCM, and thus, the state where the regulatory speed of 40 km/h is selected is not continued up to the end point of the current road link L(0) (see arrow g). Thus, the traffic sign determination section 32 can avoid selection of an erroneous regulatory speed (maximum speed before the end or change of the regulatory speed) from the en route point to the end point of the road link L(0).

Figure 5A:
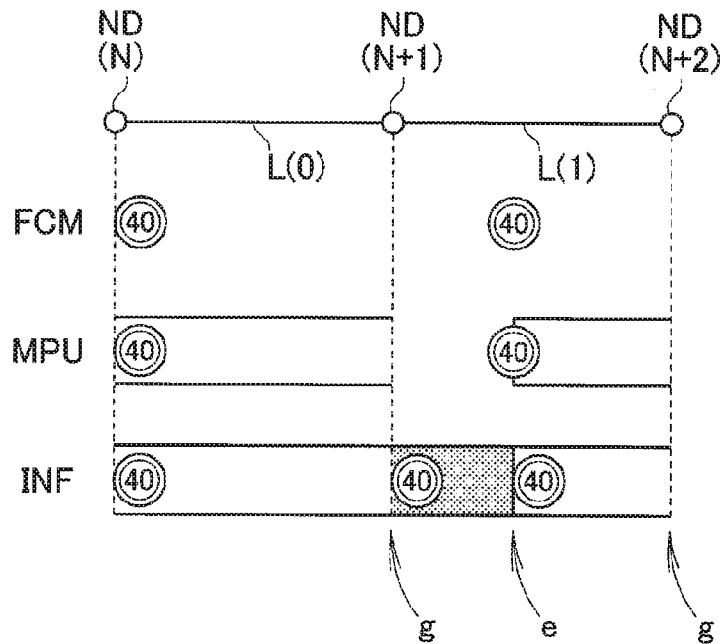
FIG. 5A is a diagram explanatory of example operation following the first example of operation shown in FIG. 3A.
Figure 5B:
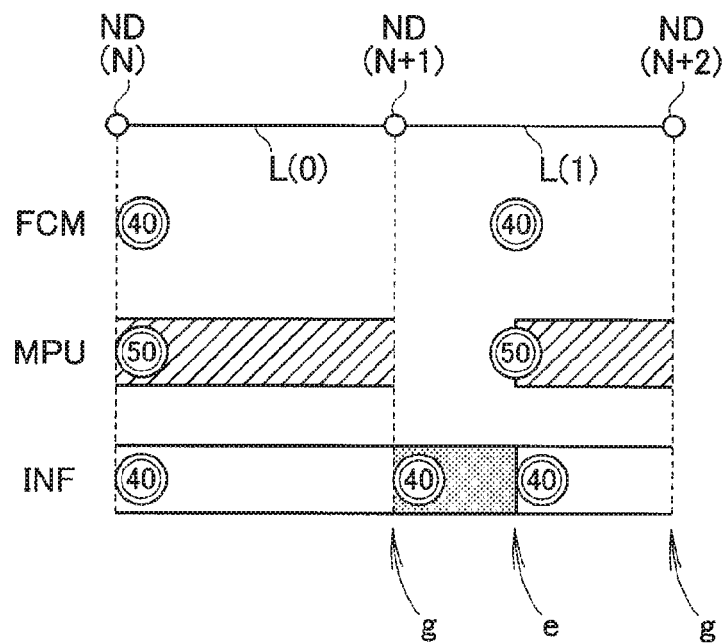
FIG. 5B is a diagram explanatory of example operation following the second example of operation shown in FIG. 3B.

FIG. 5A is explanatory of example operation following the first example of operation shown in FIG. 3A, and FIG. 5B is explanatory of example operation following the second example of operation shown in FIG. 3B. When the vehicle enters the next road link L(1) after having passed through the current road link L(0), the traffic sign determination section 32 can select a regulatory speed of, for example, 40 km/h as a final traffic regulation sign (INF). Details of the operation following the first and second examples of operation are as follows.

As the current road link L(0) switches or changes to the next road link L(1), the traffic sign determination section 32 can, for example, determine where the FCM can detect the next traffic regulation sign (e.g., regulatory speed of 40 km/h). Namely, in a case where the actual next traffic regulation sign is located at a little distance from the entrance of the next road link L(1), detection, by the FCM, of the next traffic regulation sign would be delayed, and thus, the traffic sign determination section 32 can compensate or make up for the delay. More specifically, in a case where the next road link L(1) includes the position of the next traffic regulation sign, it is determined whether the position of the vehicle has passed the position of the next traffic regulation sign, and the traffic sign determination section 32 can continue selection of the current first traffic regulation sign as the next final traffic regulation sign (INF) until the position of the vehicle passes the position of the next traffic regulation sign. In FIGS. 5A and 5B, the current final traffic regulation sign (INF) is set at the current (previous) regulatory speed, detected by the FCM, at the entrance of the next road link L(1), and the state in which the regulatory speed of 40 km/h is selected is continued from the end point (arrow g) of the current link L(0) to an en route point (arrow e) of the next road link L(1).

Even in a situation where the current road link L(0) changes, the traffic sign determination section 32 can continue selecting the current final traffic regulation sign (INF). In other words, a non-displayed state of the next final traffic regulation sign (INF) from the end point (arrow g) of the current road link L(0) to the en route point (arrow e) of the next road link L(1) can be avoided or compensated for, so that the vehicle occupant, particularly the vehicle driver, can concentrate on the driving of the vehicle when the current road link L(0) switches.

Note that, when the regulatory speed of 40 km/h is detected by the FCM at an intermediate point on the next road link L(1), the traffic sign determination section 32 can determine that the next final traffic regulation sign (INF) is that regulatory speed detected by the FCM, until the position of the vehicle passes the end point of the next road link L(1) (e.g., end point node ND(N+2)).

Figure 6A:
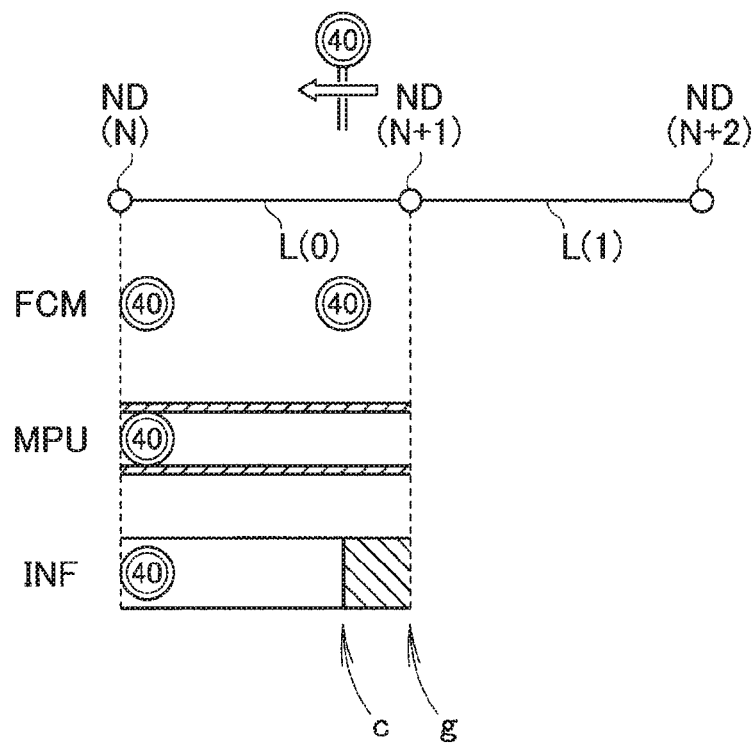
FIG. 6A is a diagram explanatory of a fifth example of operation of the traffic sign determination device of FIG. 1.
Figure 6B:
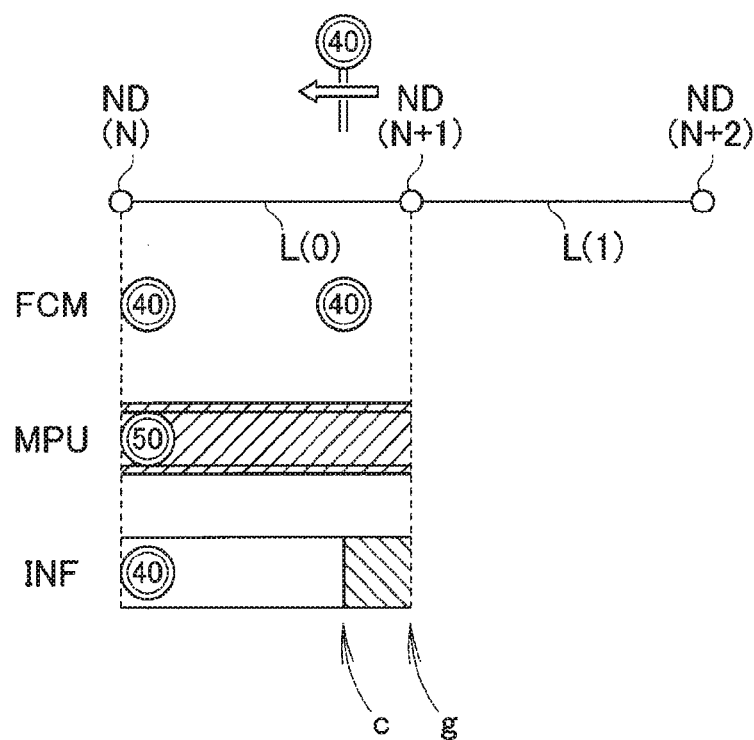
FIG. 6B is a diagram explanatory of a sixth example of operation of the traffic sign determination device of FIG. 1.

FIG. 6A is explanatory of a fifth example of operation of the traffic sign determination device 100 of FIG. 1, and FIG. 6B is explanatory of a sixth example of operation of the traffic sign determination device 100 of FIG. 1. FIGS. 6A and 6B show, as an example of an actual en-route traffic regulation sign present on the way through current road link L(0), a combination of a regulatory speed sign (main sign) and an arrow (auxiliary sign) indicative of "Up To Here". In FIGS. 4A and 4B, the MPU acquires the end or change of the regulatory speed of 40 km/h at an en route point of the current road link L(0), but in FIGS. 6A and 6B, the MPU does not acquire the end of the regulatory speed of 40 km/h at an en route point of the current road link L(0). The reason why the MPU cannot acquire the end or change of the regulatory speed is that the map data is out of date and does not include a position (coordinates) of the regulatory speed, and/or the like.

In FIGS. 6A and 6B, the FCM detects the regulatory speed of 40 km/h at an en route point of the current road link L(0), but the MPU does not acquire the end or change of the regulatory speed at an en route point of the current road link L(0), When the FCM detects two regulatory speeds of 40 km/h (i.e., detects the regulatory speed of 40 km/h twice) on the current road link L(0), the position of the last (second) regulatory speed (i.e., regulatory speed of 40 km/h detected at an en route point of the current road link L(0)) is not acquired by the MPU. In other words, the map data does not store or include the end or change of the regulatory speed at the en route point of the current road link L(0).

In FIGS. 6A and 6B, the FCM detects a regulatory speed of 40 km/h at an en route point of the current road link L(0), but the MPU does not acquire an end or change of the regulatory speed at an en route point of the current road link L(0). Thus, while the FCM detects the regulatory speed of 40 km/h twice on the current road link L(0), the position of the last regulatory speed (i.e., regulatory speed of 40 km/h detected at an en route point of the current road link L(0) is not acquired by the MPU. In other words, the map data does not include data indicative of the end or change of the regulatory speed at the en route point of the current road link L(0).

In FIGS. 6A and 6B, if the current road link L(0) does not include the position of the last regulatory speed (i.e., the regulatory speed detected for the second time) as noted above, the traffic sign determination section 32 then stops determining the current final traffic regulation sign (INF). Thus, the traffic sign determination section 32 does not select, as the current final traffic regulation sign (INF), the regulatory speed of 40 km/h (only the main sign) detected by the FCM at the en route point of the road link L(0). In addition, the traffic sign determination section 32 can cancel the selection of the regulatory speed of 40 km/h detected by the FCM at the entrance of the road link L(0) (see arrow c). In other words, in the illustrated example of FIG. 4A, the current final traffic sign (INF) is stopped at the en route point of the road link L(0) from being set at the regulatory speed detected by the FCM, and the state where the regulatory speed of 40 km/h is selected is not continued up to the end point (see arrow g) of the current road link L(0).

When the FCM detects the regulatory speed of 40 km/h twice on the current road link L(0), the traffic sign determination section 32 assumes the end or change of the regulatory speed of 40 km/h on the current road link L(0), and then the traffic sign determination section 32 can stop determining and selecting the current final traffic sign (INF), to be on the safe side. In this manner, the traffic sign determination section 32 can prevent selection of an erroneous regulatory speed (i.e., a maximum speed after the end or change of the regulatory speed) from the en route point to the end point (arrow g) of the road link L(0). The reason why the stopping of the determination and selection (arrow c) of the current final traffic sign (INF) is continued to the end point (arrow g) of the road link L(0) is that the next regulatory speed of the next road link L(1) is not detected till the end point of the road link L(0).

Figure 7A:
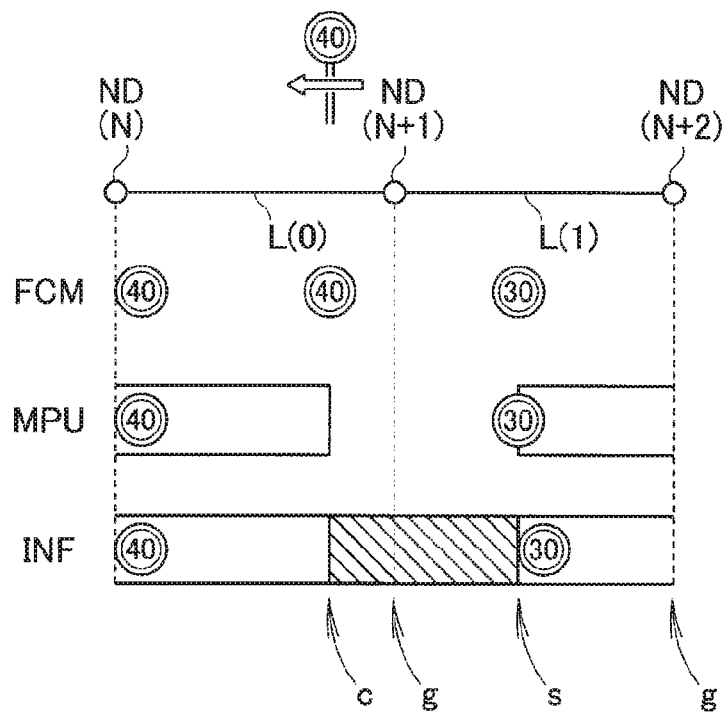
FIG. 7A is a diagram explanatory of example operation following the third example of operation shown in FIG. 4A.
Figure 7B:
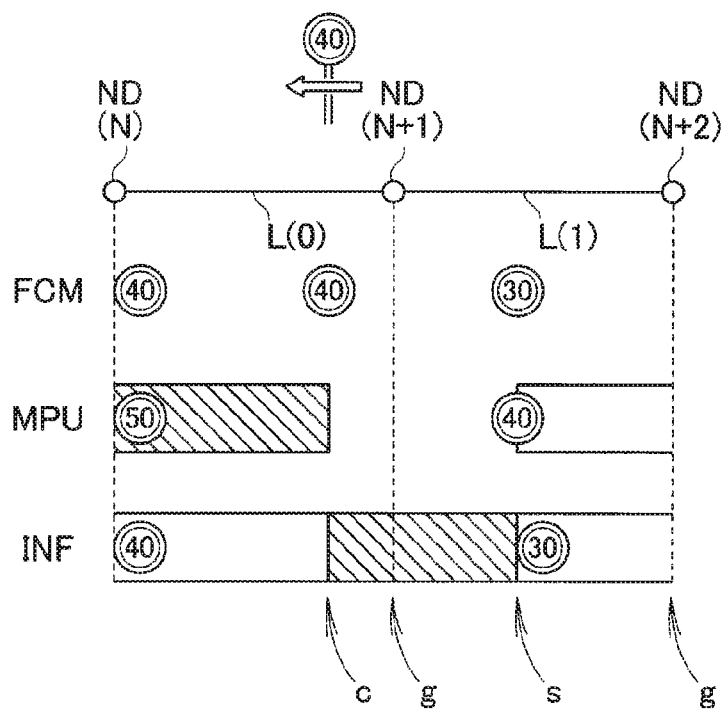
FIG. 7B is a diagram explanatory of example operation following the fourth example of operation shown in FIG. 4B.

FIG. 7A is explanatory of example operation following the third example of operation shown in FIG. 4A, and FIG. 7B is explanatory of example operation following the fourth example of operation shown in FIG. 4B. In FIGS. 7A and 7B, when the vehicle enters the next road link L(1) after having passed through the current road link L(0), the traffic sign determination section 32 can continue the non-selected state of the regulatory speed of 40 km/h as the final traffic regulation sign (INF). Details of the operation following the first and second examples of operation are as follows.

When the current road link L(0) switches or changes to the next road link L(1), the traffic sign determination section 32 can, for example, determine where the FCM can detect the next traffic regulation sign (e.g., regulatory speed of 40 km/h). Namely, in a case where the actual next traffic regulation sign is located at a little distance from the entrance of the next road link L(1), detection, by the FCM, of the next traffic regulation sign would be delayed, the traffic sign determination section 32 can await the detection of the next traffic regulation sign without making up for the delay of the detection. The reason why the traffic sign determination section 32 does not make up for the delay of the detection is that the MPU acquires the end of the regulatory speed at an en route point of the current road link L(0) and the current final traffic sign (INF) outputs nothing at the end point of the current road link L(0).

Note that, when a regulatory speed of, for example, 30 km/h is detected by the FCM at an en route point of the next road link L(1), the next final traffic sign (INF) can output the regulatory speed of 30 km/h at an en route point (arrow s) of the next road link L(1) and continue the output till the end point (arrow g) of the next road link L(1).

Figure 8A:
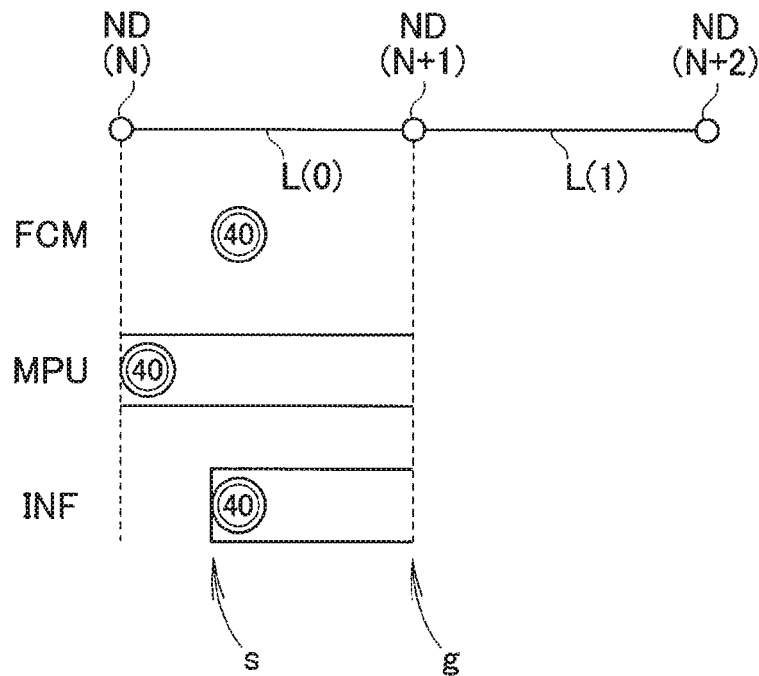
FIG. 8A is a diagram explanatory of a seventh example of operation of the traffic sign determination device of FIG. 1.
Figure 8B:
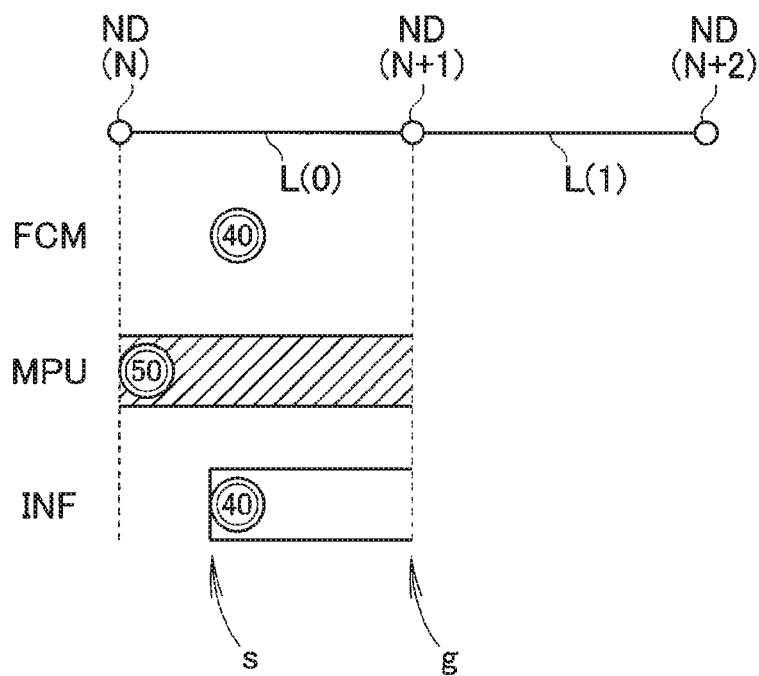
FIG. 8B is a diagram explanatory of an eighth example of operation of the traffic sign determination device of FIG. 1.

FIG. 8A is explanatory of a seventh example of operation of the traffic sign determination device 100 of FIG. 1, and FIG. 8B is explanatory of an eighth example of operation of the traffic sign determination device 100 of FIG. 1. In FIGS. 8A and 8B, an actual current traffic regulation sign is located at a little distance from the entrance of the current road link L(0). Thus, when the vehicle enters the road link L(0), the FCM does not detect a regulatory speed of, for example, 40 km/h, and the MPU acquires a regulatory speed of, for example, 40 km/h shown in FIG. 8A or a regulatory speed of, for example, 50 km/h shown in FIG. 8B. However, in consideration of a possibility that there is an error in the acquisition, by the MPU, of the regulatory speed, the traffic sign determination section 32 can invalidate the acquisition, by the MPU, of the regulatory speed.

When the vehicle is traveling on the road link L(0), the FCM detects the regulatory speed of 40 km/h at an en route point of the current road link L(0), in response to which the traffic sign determination section 32 selects the regulatory speed and the current final traffic sign (INF) can start outputting the regulatory speed at the en route point (see arrow s) of the current road link L(0).

Figure 9:
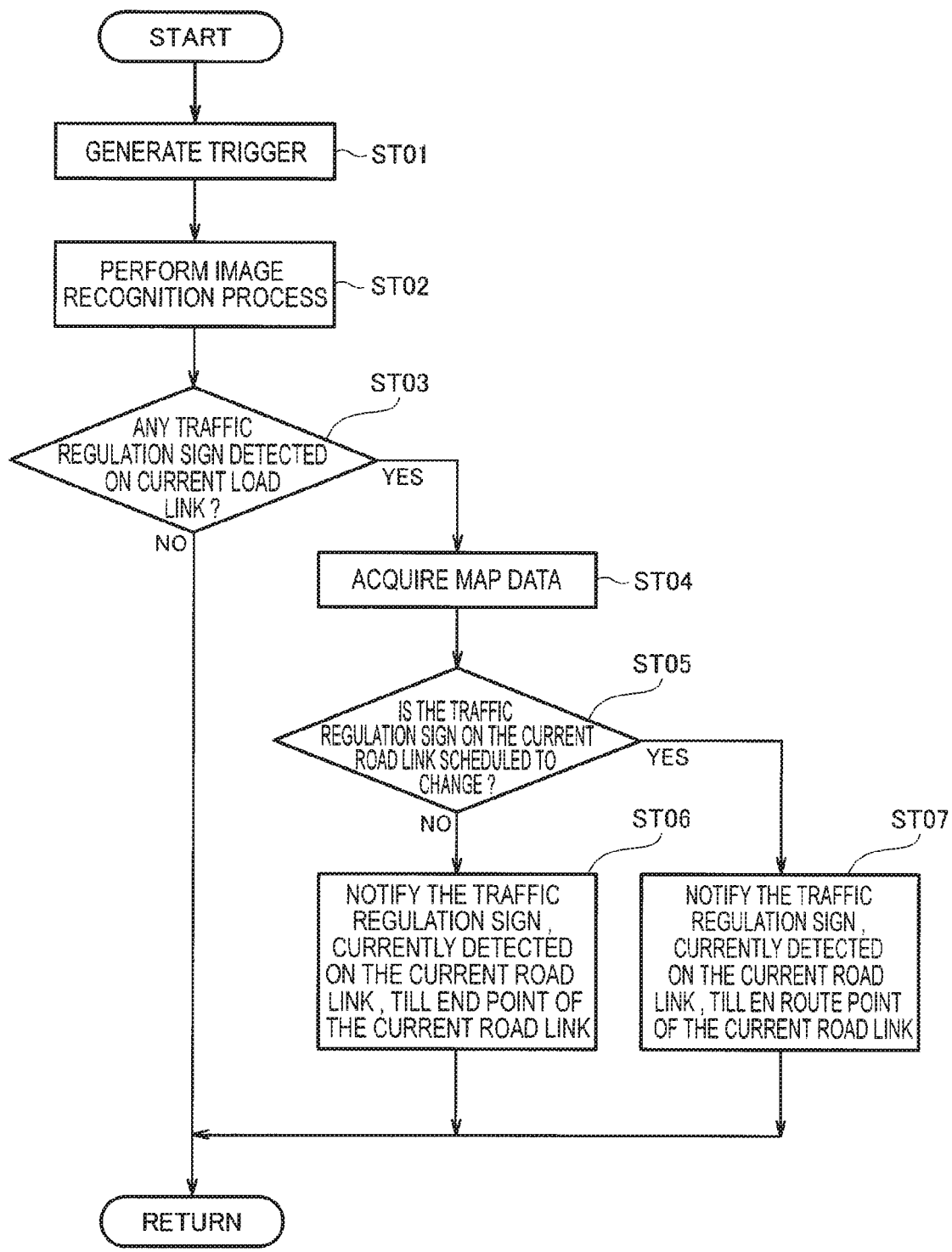
FIG. 9 is a flow chart showing example operation of the traffic sign determination device of FIG. 1.

FIG. 9 is a flow chart showing example behavior or operation of the traffic sign determination device 100 of FIG. 1. The traffic sign determination section 32 of FIG. 1 generates a trigger at step ST01 of FIG. 9. Timing for the traffic sign determination section 32 to generate such a trigger is when the position of the vehicle approaches the end point of a road link, when the position of the vehicle approaches a position of a traffic regulation sign (second traffic regulation sign) of a road link, when the image recognition section 14 inputs a picked-up image, a desired combination of the aforementioned timing, or the like.

In response to the trigger, the image recognition section 14 of FIG. 9 performs the image recognition process on the picked-up image at step ST02 of FIG. 9. If a traffic regulation sign (first traffic regulation sign) indicative for example of a regulatory speed is included in the picked-up image, the image recognition section 14 can output the traffic regulation sign (first traffic regulation sign) of the current road link to the traffic sign determination section 32. If no traffic regulation sign (first traffic regulation sign) indicative for example of a regulatory speed is included in the picked-up image, the image recognition section 14 cannot output the traffic regulation sign (first traffic regulation sign) of the current road link to the traffic sign determination section 32.

Then, at step ST03 of FIG. 9, the traffic sign determination section 32 determines whether any traffic regulation sign (first traffic regulation sign) has been detected on the current road link by the image recognition section 14. If any traffic regulation sign (first traffic regulation sign) has been detected on the current road link by the image recognition section 14 as determined at step ST03, the traffic sign determination section 32 selects the detected traffic regulation sign (first traffic regulation sign), in response to which the notification section 44 notifies the vehicle occupant of the traffic regulation sign (first traffic regulation sign), detected on the current road link by the image recognition section 14, as a current final traffic regulation sign (INF) till the end point or en route point of the current road link (step ST06 or ST07). Before that, the traffic sign determination section 32 causes the map information acquisition section 24 to acquire map data of a traffic regulation sign (second traffic regulation sign) etc.

Then, the traffic sign determination section 32 uses the map data to determine, for example, whether the traffic regulation sign (second traffic regulation sign) is going to (scheduled to) change on the current road link, at step ST05 of FIG. 9. If the traffic regulation sign (second traffic regulation sign) is not going to change on the current road link as determined at step ST05, the traffic sign determination section 32 continues selecting, as the current final traffic regulation sign (INF), the traffic regulation sign (first traffic regulation sign), currently selected on the current road link, up to or till the end point of the current road link. Thus, the notification section 44 can execute a notification corresponding to the traffic regulation sign selection state, at step ST06.

Further, if the traffic regulation sign (second traffic regulation sign) is going to (scheduled to) change on the current road link as determined at step ST05, the traffic sign determination section 32 continues selecting, as the current final traffic regulation sign (INF), the traffic regulation sign (first traffic regulation sign), currently selected on the current road link, till a middle point of the current road link (see arrow c in FIGS. 4(A) and 4(B)), and the notification section 44 can execute a notification corresponding to the traffic regulation sign selection state, at step ST07. Note that the flow chart of FIG. 9 mainly represents the aforementioned first to fourth examples of operation, and that the other aforementioned examples of operation can be carried out by modifying the flow chart of FIG. 9.

Finally, it should be appreciated that the present invention is not limited to the above-described illustrative embodiment and that various modifications thereof are possible within the scope of the appended claims.

What is claimed is:

1. A traffic sign determination device comprising:
    an image recognition section configured to detect a first traffic regulation sign by performing an image recognition process which detects a traffic sign by determining whether a predetermined pattern of characters or figures is present in the input picked-up image on an image of an area in front of a vehicle picked up by an imaging section provided on the vehicle;
    a map information acquisition section configured to acquire a road link, using a position of the vehicle, including a second traffic regulation sign at the position of the vehicle, by accessing a map data storage section storing map data that includes road link information related to roads constituting a map; and
    a traffic sign determination section configured to determine a selection of a current traffic regulation sign to be notified to an occupant of the vehicle on the current road link based on the first traffic regulation sign and the second traffic regulation sign;
    wherein after detection of the current first traffic regulation sign on the current road link, when the current second traffic regulation sign on the current road link changes from a situation in which the current second traffic regulation sign agrees with the current first traffic regulation sign, the traffic sign determination section stops determining the current traffic regulation sign to be notified to the occupant of the vehicle and cancels the selection of the first traffic regulation sign as the current traffic regulation sign.

2. The traffic sign determination device according to claim 1, wherein, when the current first traffic regulation sign is detected on the current road link, the traffic sign determination section, until the position of the vehicle passes the end point of the current road link, determines that a current traffic regulation sign to be notified to an occupant of the vehicle is the current first traffic regulation sign detected on the current road link, and the traffic sign determination section determines whether or not the current first traffic regulation sign detected on the current road link agrees with a current second traffic regulation sign acquired on the current road link by the map information acquisition section, and
    wherein, when the current first traffic regulation sign does not agree with the current second traffic regulation sign, the traffic sign determination section selects the current first traffic regulation sign as the current traffic regulation sign to be notified to the occupant of the vehicle.

3. A traffic sign determination method comprising:
    detecting a first traffic regulation sign by performing an image recognition process which detects a traffic sign by determining whether a predetermined pattern of characters or figures is present in the input picked-up image, on an image of an area in front of a vehicle picked up by an imaging section provided on the vehicle;
    acquiring a road link, by using a position of the vehicle to acquire a road link, including a second traffic regulation sign at the position of the vehicle, by accessing a map data storage section storing map data that includes road link information related to roads constituting a map;
    doing a determination process which determines a selection of a current traffic regulation sign to be notified to an occupant of the vehicle on a current road link based on the first traffic regulation sign and the second traffic regulation sign; and
    in the determination process, after detection of the current first traffic regulation sign on the current road link, when the current second traffic regulation sign on the current road link changes from a situation in which the current second traffic regulation sign agrees with the current first traffic regulation sign, stopping determination of the current traffic regulation sign to be notified to the occupant of the vehicle and canceling the selection of the first traffic regulation sign as the current traffic regulation sign.

4. A traffic sign determination device comprising:
an image recognition section configured to detect a first traffic regulation sign by performing an image recognition process which detects a traffic sign by determining whether a predetermined pattern of characters or figures is present in the input picked-up image, on an image of an area in front of a vehicle picked up by an imaging section provided on the vehicle;
a map information acquisition section configured to acquire a road link, using a position of the vehicle, including a second traffic regulation sign at the position of the vehicle, by accessing a map data storage section storing map data that includes road link information related to roads constituting a map; and
a traffic sign determination section configured to determine a selection of a current traffic regulation sign to be notified to an occupant of the vehicle on a current road link based on the first traffic regulation sign and the second traffic regulation sign;
wherein, before detection of the current first traffic regulation sign on the current road link, when a current second traffic regulation sign is acquired on the current road link, the traffic sign determination section does not select the current second traffic regulation sign as the current traffic regulation sign to be notified to the occupant of the vehicle.

5. The traffic sign determination device according to claim 4,
wherein, when the current first traffic regulation sign is detected on the current road link, the traffic sign determination section, until the position of the vehicle passes an end point of the current road link, determines that the current traffic regulation sign to be notified to an occupant of the vehicle is the current first traffic regulation sign detected on the current road link, and
the traffic sign determination section determines whether or not the current first traffic regulation sign detected on the current road link agrees with the current second traffic regulation sign acquired on the current road link by the map information acquisition section, and
wherein, when the current first traffic regulation sign does not agree with the current second traffic regulation sign, the traffic sign determination section selects the current first traffic regulation sign as the current traffic regulation sign to be notified to the occupant of the vehicle.

6. A traffic sign determination method comprising:
detecting a first traffic regulation sign by performing an image recognition process which detects a traffic sign by determining whether a predetermined pattern of characters or figures is present in the input picked-up image, on an image of an area in front of a vehicle picked up by an imaging section provided on the vehicle;
acquiring a road link, using a position of the vehicle, including a second traffic regulation sign at the position of the vehicle, by accessing a map data storage section storing map data that includes road link information related to roads constituting a map;
doing a determination process which determines a selection of a current traffic regulation sign to be notified to an occupant of the vehicle on a current road link based on the first traffic regulation sign and the second traffic regulation sign; and
in the determination process, when the current second traffic regulation sign is acquired on the current road link before detection of the current first traffic recognition sign on the current road link, not selecting the current second traffic regulation sign as the current traffic regulation sign to be notified to the occupant of the vehicle.

* * * * *